Figure 1:
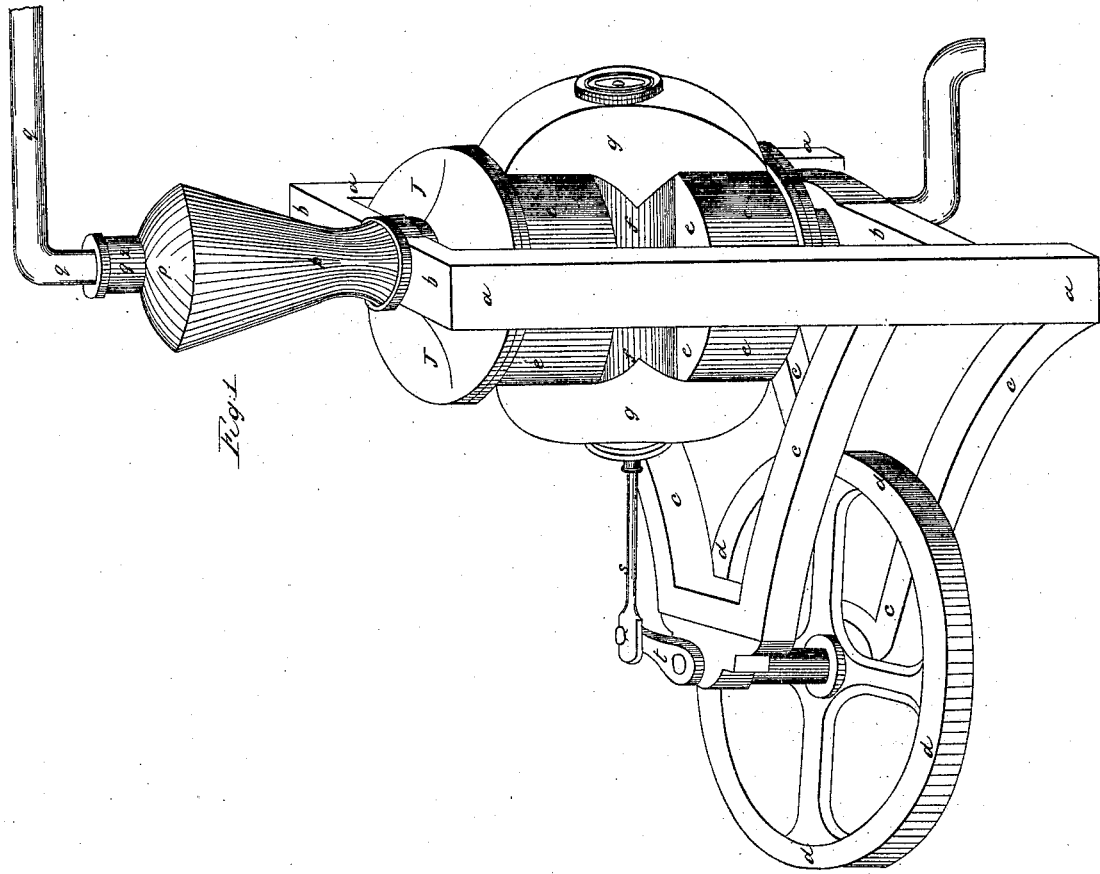

J. D. Heaton,

Hydraulic Engine,

N° 18,280. Patented Sep. 29, 1857.

Sheet 2-2 Sheets.
J. D. Heaton,
Hydraulic Engine,
N° 18,280. Patented Sep. 29, 1857.
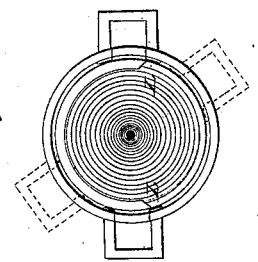
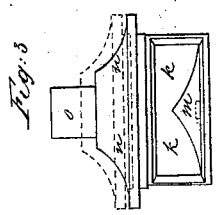
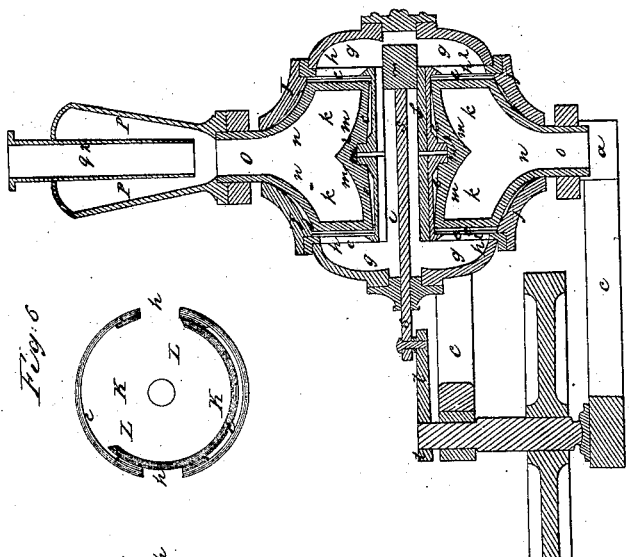
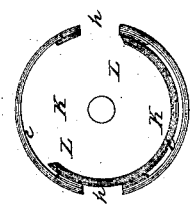
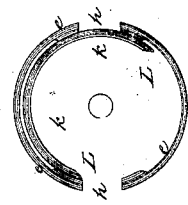
N. PETERS, PHOTO-LITHOGRAPHER, WASHINGTON, D. C.

UNITED STATES PATENT OFFICE.

JOHN D. HEATON, OF DIXON, ILLINOIS.

HYDRAULIC ENGINE.

Specification of Letters Patent No. 18,280, dated September 29, 1857.

*To all whom it may concern:*

Be it known that I, JOHN D. HEATON, of Dixon, in the county of Lee and State of Illinois, have invented and made certain new and useful Improvements in Hydraulic Motors or Water-Engines; and I do hereby declare that the following is a full, clear, and exact description of the same, reference being had to the accompanying drawings, making a part of this specification, Figure 1 being a perspective view of the engine complete. Fig. 2 is a vertical sectional view of the engine. Fig. 3 is a vertical view of one of the stationary valves detached. Fig. 4 is a top view of one of the valves detached. Figs. 5 and 6 are vertical views of the two valves detached and showing their positions relative to the opening and closing of the parts of the engine.

The nature of my improvements consists in constructing an oscillating water engine with peculiarly constructed stationary valves, and whereby is brought about the economical employment of a small volume of water and applied in such a manner as to afford sufficient power to drive at a very moderate expense machinery of various kinds.

The construction of my engine is as follows, viz: I have provided a suitable framing of required strength and dimensions, formed of two upright timbers $a, a, a, a$, and two horizontal cross rails $b, b, b$. To these I attach horizontally two suitable standards $c, c, c, c, c$, to which is arranged by its shaft, horizontally a fly, or balance, driving wheel $d, d, d, d$. The peculiarities however of my engine are in the water chambers, the water compartments, and the stationary valves.

By reference to Fig. 1, it will be perceived that $e, e, e, e, e, e, e, e$, are water chambers, attached on each side of a horizontal cylinder $f, f$, whose ends terminate at and connect with circular pressure chambers, or water compartments $g, g, g, g$, each compartment having an inlet port $h, h$, and an outlet port $h^2, h^2$, Fig. 2. Within the water chambers, on the bottom thereof, are suitable short journal ends $i, i$, Fig. 2. The water chambers have suitable caps, or tops $J, J, J, J$, of a conical shape, and are fitted closely to the chambers $e, e, e, e, e, e$. The water chambers, the compartments, and the cylinder are all formed of and cast in one piece. Within the water chambers are arranged hollow valves $k, k, k, k$, Figs. 2, 3, 5, 6. Slightly less than one half of the circumference of these valves are cut out, forming an open side, as shown at L, L, L, L, Figs. 4, 5 and 6. The bottom of these hollow valves are coniform, or slightly pyramidal, as at $m, m, m, m$, Figs. 2, 3, the underside formed with a socket, or pivot step, $m^2, m^2$, Fig. 1. While their upper part of the valves are bell-like, or of a coniform concave shape as at $n, n, n, n, n;$ terminating in a short tubular neck as at $o, o, o$, Figs. 2, 3. These peculiarly formed valves, being arranged within their seats or water chambers, are held vertically in position by their tubular ends $o, o, o$, attached permanently in journal places formed in the cross rails $b, b, b, b$, so as to prevent the valves from rotating or moving out of true. To the top end, or neck part of the upper valve, is fitted an air chamber P, P, of the form shown, and provided with a central tube $P^2$, to which is to be fitted a conduit or induction pipe $q, q;$ and to the under, or lower, valve neck, is an eduction or escape pipe, which is of suitable length, and its terminus formed of a trumpet like shape.

Within the cylinder $f, f$, is fitted, a piston $r, r, r$, the rod $s, s, s$, of which is connected to a crank arm $t, t$, attached to the axle or shaft of the fly wheel, which runs as is shown in a horizontal position.

All the parts of the engine must be made, and put together with suitable packing. The area of the internal surface of the ports, the pressure chambers, the supply and discharge pipes must be equal together to the area of the piston cylinder, and the diameter of the induction or supply pipe P, P may diminish with the increase of the volume of head, and fall of water. The forms of the sides of the water chambers $e, e, e, e, e, e,$ and the valves fitting therein may be more conical in construction than vertical, so as to work closely and be water-tight and secure should it be desirable to employ steam, hot air, or gas.

The operation of my engine is as follows: Being stationed at the terminus of a fore bay, or water channel, having a sufficient fall, and arranged so that the running volume of water shall be conducted through pipes or tubes, and enter into the central tube $P^2$, of the air chamber, and thence pass down through the neck $o, o$, enter and fill the hollow valve $k, k, k, k$, observing that in starting the engine the valves must be open, or past the dead point, as in Figs. 5 and 6. This position of the valves enables the filling or charging of the compartments and cylinder throughout the whole of the machine, and as the volume or flow of water continues downward through the eduction, or outlet pipe, which pipe is immersed in the spent volume beneath the engine, and thus it will be seen that addition to the hydrostatic force is brought into requisition. Having charged the engine with water, throughout all its ramifications, the balance wheel is set in motion, which causes the cylinder part and chambers to oscillate, around the stationary valves, and which movement causes the ports $h$, $h$, $h$, $h$, alternately to be opened and closed above and below. The position of the stationary valves, being as shown in Figs. 5, 6. This oscillating motion enables the volume of water to enter the cylinder and to act alternately on the front and back part of the piston, and which consequently gives motion thereto.

It must be observed that at or about the passing of the dead point; that is, when the position of the crank arm is such as to nearly close the ports, the oscillation of the engine is the greatest. And on that portion of the valve which cuts off the water is exerted the greatest pressure or force, while the opposite port is open to the flow of water. And when the piston head reaches its utmost extent, all the ports are closed or shut off; hence the pressure is balanced on the valve. And when one of the ports is entirely closed and the other entirely open as at $h$, $h$, $h$, $h$, Figs. 5, 6, the pressure is then wholly on the side of the valve which closes said port as at $h$, $k$, Fig. 5. Thus the pressure of the passing volume is reversed or alternates on opposite sides as indicated by the position of Figs. 3 and 4. This reverse pressure occurs twice in one revolution of the balance wheel, and it will be perceived too that the pressure is reversed on opposite sides of the piston head, independently of any valvular movement, because the valves are stationary, and being suspended or sustained by their short tubular neck, the body part of the engine must work smoothly and with accuracy of oscillation, and divested greatly of friction and strain of parts.

If deemed proper, and in order to make the engine less costly, the vertical air chamber P, P, may be entirely dispensed with, and, by arranging the engine horizontally, having the fly wheel to run vertically, the parts $g$, $g$, $g$, $g$, then may be made to answer as and perform the service of air chambers.

It is believed by actual test, and use, that my oscillating water engine possesses to a very great and unusual degree greater advantages than the majority of engines in use, presenting as my improvements do the important features of simplicity, durability, cheapness of construction, and certainty of operation, and general adaptability to water, steam, hot air, or gas.

Having described the nature, construction, and operation of my improvements, what I claim as new, and desire to secure by Letters Patent of the United States, is—

1. The peculiarly constructed form and application, and the arrangement of the stationary valves $k$, L, $m$, $n$, $o$, Figs. 2, 3, 4, 5, 6, and as operated.

2. I also claim the construction and arrangement of the water chambers, $e$, $e$, $e$, pressure compartments $g$, $g$, and cylinder $f$, $f$, combined in one single piece, substantially as shown and described.

JOHN D. HEATON.

Witnesses:
  JOHN S. HOLLINGSHEAD,
  JOHNSON SIMONDS.